United States Patent
Kamkar-Parsi et al.

(10) Patent No.: US 11,943,586 B2
(45) Date of Patent: Mar. 26, 2024

(54) METHOD FOR OPERATING A HEARING AID, AND HEARING AID

(71) Applicant: Sivantos Pte. Ltd., Singapore (SG)

(72) Inventors: Homayoun Kamkar-Parsi, Erlangen (DE); Marko Lugger, Weilersbach (DE); Umut Goekay, Mainz (DE)

(73) Assignee: Sivantos Pte. Ltd., Singapore (SG)

(*) Notice: Subject to any disclaimer, the term of this patent is extended or adjusted under 35 U.S.C. 154(b) by 0 days.

(21) Appl. No.: 17/501,323

(22) Filed: Oct. 14, 2021

(65) Prior Publication Data

US 2022/0124441 A1    Apr. 21, 2022

(30) Foreign Application Priority Data

Oct. 15, 2020   (DE) .................... 10 2020 213 051.5

(51) Int. Cl.
  *H04R 25/00* (2006.01)
  *G10L 17/04* (2013.01)
  *G10L 21/0208* (2013.01)

(52) U.S. Cl.
  CPC .............. *H04R 25/50* (2013.01); *G10L 17/04* (2013.01); *G10L 21/0208* (2013.01); *H04R 2225/43* (2013.01)

(58) Field of Classification Search
  None
  See application file for complete search history.

(56) References Cited

U.S. PATENT DOCUMENTS

| | | |
|---|---|---|
| 7,853,031 B2 | 12/2010 | Hamacher |
| 10,403,306 B2 | 9/2019 | Kamkar Parsi et al. |
| 10,616,694 B2 | 4/2020 | Parsi et al. |
| 2010/0002896 A1* | 1/2010 | Arndt .................. H04R 25/305 381/318 |
| 2014/0329568 A1* | 11/2014 | Xue ...................... G10K 11/16 455/570 |
| 2015/0262590 A1* | 9/2015 | Joder .................. G10L 21/0216 704/201 |
| 2016/0105751 A1* | 4/2016 | Zurbruegg ........... H04R 25/505 381/317 |
| 2018/0061411 A1 | 3/2018 | Bhat |
| 2018/0213336 A1* | 7/2018 | Rosenkranz ......... H04R 25/453 |
| 2019/0075406 A1 | 3/2019 | Petersen et al. |
| 2020/0314565 A1 | 10/2020 | Sigwanz et al. |

FOREIGN PATENT DOCUMENTS

| | | |
|---|---|---|
| DE | 102005032274 A1 | 1/2007 |
| DE | 102016203987 A1 | 9/2017 |
| EP | 3005731 B1 | 3/2017 |
| EP | 3451705 A1 | 3/2019 |

* cited by examiner

*Primary Examiner* — Walter F Briney, III
(74) *Attorney, Agent, or Firm* — Laurence A. Greenberg; Werner H. Stemer; Ralph E. Locher

(57) ABSTRACT

A method for operating a hearing aid which has an auditory canal microphone for capturing sound in the auditory canal of the wearer and an own voice recognition unit for carrying out an adaptive own voice recognition. Sound in the auditory canal is captured by the auditory canal microphone and a signal that corresponds to the sound is output by the auditory canal microphone, and training of the adaptive own voice recognition is controlled only based on the signal output by the auditory canal microphone. A corresponding hearing aid configured to carry out the method.

9 Claims, 2 Drawing Sheets

METHOD FOR OPERATING A HEARING AID, AND HEARING AID

CROSS-REFERENCE TO RELATED APPLICATION

This application claims the priority, under 35 U.S.C. § 119, of German patent application DE 10 2020 213 051.5, filed Oct. 15, 2020; the prior application is herewith incorporated by reference in its entirety.

FIELD AND BACKGROUND OF THE INVENTION

The invention relates to a method for operating a hearing aid comprising an auditory canal microphone, wherein sound in the auditory canal of the wearer is captured by the auditory canal microphone and a signal that corresponds to the sound is output by the auditory canal microphone. Moreover, the invention relates to such a hearing aid.

Hearing aids, particularly for the hard of hearing, are provided in different types in order to accommodate the individual needs of the wearer. By way of example, hearing aids are embodied as behind-the-ear ("BTE") hearing aids, as receiver-in-canal ("RIC") hearing aid or as in-the-ear ("ITE") hearing aids.

Hearing aids comprise at least one electroacoustic transducer, in particular a microphone, which is used to capture (airborne) sound from the surroundings of the wearer. A corresponding signal output by the transducer is processed by a signal processing unit in respect of the needs of the wearer, said signal being amplified in particular. The processed signal is transmitted to a receiver (loudspeaker), and output by the latter as sound into the auditory canal or at the eardrum of the wearer.

The wearer (user) of a hearing aid perceives their own voice differently to the way it is recorded by the microphone of the hearing aid, which typically captures airborne sound, on account of the body-borne sound and/or—providing the hearing aid seals the auditory canal of the wearer in part or in full—on account of the occlusion effect.

Consequently, so that the wearer considers the perception of their own voice and of external audio sources to be normal, the own voice of the wearer and other external audio sources have to be processed differently. To this end, the own voice of the wearer needs to be recognized in a first step.

By way of example, a method for recognizing the own voice of the wearer is known from EP 3 451 705 A1. In the method described therein for quickly recognizing the own voice of a hearing-aid wearer, the audio signals of at least a first microphone and a second microphone are used. The audio signal from the first microphone is filtered by a first filter which attenuates the own voice of the hearing-aid wearer. Furthermore, the audio signal of the second microphone is damped by a second filter which attenuates an external audio source. The output signals of the two filters are compared to one another and the voice of the hearing-aid wearer is recognized based on the result. In this case, the first filter can be an adaptive filter. By way of example, the first filter is realized by an adaptive algorithm which adaptively ascertains the filter parameters of the first filter such that these filter parameters can be ascertained during a training with the own voice of the hearing-aid wearer. Here, training is implemented either within the scope of fitting at the hearing-aid acoustician or by the wearer themselves during their normal voice activity, with additional reference information about speech activity present being transmitted, for example by way of a remote control or a smartphone.

Furthermore, DE 10 2016 203 987 A1 has disclosed a method for operating a hearing aid, in which a noise recorded by means of a microscope is analyzed in respect of the correspondence thereof to the voice of the hearing-aid wearer. A feature value is output as a result of the analysis and compared to a threshold. Here, the threshold is set in a manner dependent on the surroundings, i.e., in accordance with ascertained surroundings. The threshold is set for the respective surroundings situation either within the scope of a fitting session at the acoustician, in a specific calibration operation or during normal operation of the hearing aid.

DE 10 2005 032 274 A1 illustrates a hearing aid and a method for the operation thereof. To detect the own voice of the hearing-aid wearer, a sound signal of a first microphone for recording an ambient sound and a sound signal of a second microphone for recording an auditory canal sound are analyzed. To this end, the levels of the two sound signals are compared to one another and the presence of the own voice is deduced based on the comparison.

EP 3 005 731 B1 has described a method for operating a hearing aid comprising a surround microphone, a signal processing unit, a receiver and an auditory canal microphone. Here, the audio signal of the surround microphone, which is processed by the signal processing unit with a filter, is filtered with a transfer function that comprises at least one transfer function from an output of the receiver to an input of the auditory canal microphone when the hearing aid is activated and worn in an auditory canal of the user. A difference between the audio signal recorded by the auditory canal microphone and the filtered signal is calculated and the presence of an own voice of the user is recognized based on the difference.

US 2019/0075406 A1 has disclosed a hearing aid comprising an auditory canal microphone to be worn on or in the auditory canal of the user, and a further behind-the-ear microphone arranged on or behind an ear of the user. Here, the own voice of the user is recognized if a sound pressure level at the auditory canal microphone is at least 2.5 dB greater than that at the behind-the-ear microphone. The hearing aid comprises a beamformer filter unit made of an adaptive algorithm for providing a spatially filtered signal. In this case, the beamformer filter unit may comprise a predefined and/or adaptively updated own speech beamformer, which is focused on the mouth of the user.

SUMMARY OF THE INVENTION

The invention is based on the object of specifying a method for operating a hearing aid, in which training of the own voice recognition is implemented as effectively as possible and/or as comfortably as possible for the wearer of the hearing aid. Moreover, such a hearing aid should be specified.

In respect of the method, the object is achieved according to the invention by the features of the claims. In respect of the hearing aid, the object is achieved according to the invention by the features of the claims. Advantageous developments and configurations are the subject matter of the dependent claims. Here, the explanations in the context of the method also apply analogously to the hearing aid, and vice versa.

The method serves for the operation of a hearing aid. Here, such a hearing aid is understood to mean a device for treating a person whose hearing is damaged or impaired and who wears the device—expediently continuously or for most of the time—to compensate a hearing deficiency. By way of example, said device is embodied as a behind-the-ear hearing aid or as an in-the-ear hearing aid.

The hearing aid comprises an auditory canal microphone for capturing sound, in particular airborne sound, in the auditory canal of the wearer (user) of the hearing aid. In particular, the auditory canal microphone is provided and set up to be introduced into and worn in the auditory canal of the user when the hearing aid is used. If sound in the auditory canal is captured by the auditory canal microphone, the latter outputs a signal corresponding to the sound, i.e., a signal representing the sound. Below, this signal is also referred to as auditory canal signal.

Expediently, the hearing aid furthermore comprises a second microphone, specifically a surround microphone, for capturing sound from the surroundings of the wearer. In a manner analogous to the auditory canal microphone, the surround microphone outputs a further signal, which is referred to as surround signal below and which corresponds to the captured surround sound, if sound from the surroundings of the wearer of the hearing aid is captured by the surround microphone.

Furthermore, the hearing aid has an own voice recognition unit. By way of example, the latter is part of a control unit or, alternatively, it is embodied as a unit separate from the control unit. By way of example, the own voice recognition unit is realized as an integrated circuit. The auditory canal signal and/or the surround signal are transmitted from the auditory canal microphone and from the surround microphone, respectively, to the own voice recognition unit or to the control apparatus.

The own voice recognition unit serves to carry out an analysis of the surround signal and/or of the auditory canal signal to the effect of whether or not the own voice of the wearer is present; this analysis is also referred to as own voice recognition or as own voice detection (OVD).

Suitably, the analysis of the respective signal is carried out based on an algorithm or based on one filter or a plurality of filters. In particular, the algorithm, the filter or one of the filters is embodied such that when it is applied a signal corresponding to the own voice of the wearer is attenuated to the greatest possible extent. Then, within the scope of the analysis of the surround signal and/or the auditory canal signal, the presence of the own voice is deduced based on the absolute value of the attenuation. Thus, in this case, a sound path from the mouth of the wearer to the hearing aid is represented as accurately as possible and use is made of a transfer function for the attenuation of the signal which is applicable for this sound path, i.e., which corresponds to this sound path.

In this case, the own voice recognition is adaptive. Expressed differently, the algorithm or the filter or the filters used to carry out the analysis of the respective signal are adaptable and changeable. In particular, one of the parameters thereof or one of the coefficients thereof is adaptable and changeable. The algorithm or the filter is set, in particular the parameters thereof and/or the coefficients thereof are adapted, within the scope of training the own voice recognition. Preferably, the algorithm or the filter is set such that the part of the analyzed signal corresponding to the own voice of the wearer is attenuated more strongly than before the training. As an alternative thereto, the algorithm or the filter is set such that an attenuation, in particular an absolute value of the attenuation, of the part of the analyzed signal corresponding to the own voice of the wearer is matched to a specified value or is made to drop below a specified, and for example adjustable, threshold.

According to the method, such a training of the adaptive own voice recognition is controlled based on the (auditory canal) signal, in particular based on a property of same, output by the auditory canal microphone. In particular, the training is started, finished or interrupted based on the (auditory canal) signal. Provided the training has started, a filter or algorithm that was already adapted by a preceding training can also be adapted further. Preferably, the training is started or an already started training is continued if the auditory canal signal or a variable derived from the auditory canal signal, particularly preferably only derived from the auditory canal signal, has a predefined property.

The invention is based on the discovery that whether the captured auditory canal signal and optionally the surround signal is suitable for training can be determined particularly reliably based on (only) the auditory canal signal. Consequently, the training is implemented particularly reliably and effectively.

Preferably, in addition to the auditory canal signal, no further signal recorded by another microphone, in particular the surround signal, is used for determining how the training is controlled.

According to a suitable configuration of the method, the auditory canal signal is analyzed in respect of the presence of the own voice and provided the own voice is recognized, the training is started or—provided the training has already been started—continued. Provided the own voice is not recognized, no training is started or an already started training is finished or interrupted (paused). In this case, determining whether the own voice of the wearer of the hearing aid is present, i.e., whether the wearer themselves is talking, can be carried out comparatively reliably based on the auditory canal signal. Thus, a particularly reliable indicator for the presence of the own voice can be ascertained based on the signal.

According to a suitable configuration, the level of the auditory canal sound or a corresponding value of the auditory canal signal is compared to a given threshold for the analysis of the auditory canal signal in respect of the presence of the own voice, with different thresholds possibly being specified for different spectral regions, i.e., for different frequency bands, of the sound or the signal. If the level or the auditory canal signal exceeds the threshold, the own voice is deduced and the training is started or continued.

For the purposes of analyzing the auditory canal signal in respect of the presence of the own voice, the auditory canal signal is alternatively or additionally examined based on a spectral analysis for features that are characteristic for the own voice of the wearer, said characteristic features for example arising from the sound path through the head from the mouth to the auditory canal of the wearer. By way of example, an absorption as a function of the frequency is estimated or determined to this end.

Further alternatively or additionally, an algorithm or a filter for voice recognition is applied to the auditory canal signal and an attenuation of same is compared to a specified threshold for the analysis of the auditory canal signal in respect of the presence of the own voice.

According to an advantageous configuration of the method, the training is started and carried out or continued automatically during normal operation, and hence online. The normal operation should be understood to mean a mode of operation of the hearing aid which, in particular, is characterized by the intended use of the hearing aid for compensating a hearing deficit of the wearer on the basis of processing a sound recorded by at least one of the microphones and on the basis of the output of an appropriate output sound to the ear of the wearer. In particular, this does not include speech sequences and/or noise sequences defined in advance for the purposes of training the own voice recognition.

No process defined by means of a protocol and comprising specified speech sequences is required for the training, in particular for adapting the algorithm or the filter or the filters within the scope of the training. Consequently, the training process within the scope of general fitting at the acoustician or within the scope of a process defined on the basis of the protocol by the wearer themselves can be dispensed with. Nevertheless, the training may also already take place during the fitting session at the acoustician within the scope of a normal conversation, which therefore has no speech sequences and/or noise sequences defined in advance.

Moreover, to start the training it is no longer necessary for additional reference information to be transmitted in particular from the user via their speech activity by means of an interface, for example a smartphone or a remote control. In summary, the training of the own voice recognition is particularly convenient for the wearer.

According to an advantageous configuration of the method, whether the acoustic surroundings of the hearing aid are suitable for the training is determined based on the auditory canal signal and/or on the basis of the surround signal. In particular, the acoustic surroundings are analyzed in respect of a noise and/or in respect of a reverberation time to this end. Depending on the result of this analysis, the training is started or still carried out (continued) provided the surroundings were determined to be suitable; otherwise the training is finished or preferably interrupted until the surroundings are determined to be suitable again.

By way of example, a threshold for a noise value, in particular for a noise level, is specified, with the training only being started provided this threshold was undershot. Suitably, a signal-to-noise ratio, which is abbreviated SNR, alternatively is determined for the auditory canal signal and/or for the surround signal and compared to a given threshold. In this case, the threshold is for example 15 dB (decibel), 20 dB or 25 dB for the signal-to-noise ratio. If the threshold is exceeded by the signal-to-noise ratio ascertained from the corresponding signal then the training can be started or continued and, expediently, it also is started or continued.

In particular, the noise value, in particular the level of the noise in the acoustic surroundings of the hearing aid, is determined for the auditory canal signal by means of a noise estimator which is based for example on the "minimum statistics approach". By way of example, the auditory canal signal itself is used to this end. For a more accurate determination of the noise value, the auditory canal signal is initially amplified in accordance with a known damping of the signal from the surroundings by a housing carrying the auditory microphone and/or by a dome, and the noise value of the amplified signal is ascertained by means of a noise estimator.

Expediently, the noise value for the surround signal is also determined by means of the noise estimator. Preferably, the training is only started or continued if the noise value of the auditory canal signal and the noise value of the surround signal are below a specified or respectively assigned threshold.

As an alternative or in addition to determining the noise value, the acoustic surroundings of the hearing aid are analyzed in respect of a reverberation time. Provided the ascertained reverberation time is shorter than a specified threshold of, e.g., less than 500 ms, in particular less than 300 ms, the training can be started or still carried out and it is expediently also started or continued.

This advantageously avoids or least reduces the risk of an unsuitable or even incorrect training, in particular an unsuitable or incorrect adaptation of the algorithm or of the filter or filters of the own voice recognition, and so the training is more effective.

Preferably, the acoustic surroundings of the hearing aid are analyzed when the own voice was recognized in the manner presented above based on the auditory canal signal, for example on the basis of the level thereof or on the basis of the spectral analysis thereof. Subsequently—depending on the result of the analysis of the acoustic surroundings—the training is started or still carried out or finished or interrupted until the surroundings are determined to be suitable again.

According to a suitable development of the method, a convergence value (recognition value) is determined, suitably after the adaptation of the algorithm or the filter or filters within the scope of the training or after the training. This convergence value represents a measure or a quality for the recognition of the own voice by means of the own voice recognition. Furthermore, further training is admitted or the training is continued or skipped depending on the convergence value.

By way of example, the absolute value of the damping of the surround signal and/or of the auditory canal signal during the application of the algorithm or the filter or filters for the own voice recognition is used as convergence value. In this case, the surround signal or the auditory canal signal substantially corresponds to the signal of the own voice since, as described above, the training takes place based on the auditory canal signal, and consequently especially when the own voice is present, and optionally only in the case of suitable acoustic surroundings.

Expediently, the convergence value is compared to a specified threshold, which suitably corresponds to damping of 15 dB or preferably 20 dB or alternatively 25 dB. If the convergence value is greater than the threshold, i.e., if a quality of the recognition of the own voice is sufficiently high, no further training is admitted or the training is finished. In a corresponding manner, further training is admitted or the training is continued provided the convergence value is less than the threshold. By way of example, the further training is carried out after a minimum time period following the preceding training. As an alternative thereto, the further training is implemented as soon as the own voice was recognized again based on the auditory canal signal.

According to an advantageous configuration of the method, a malposition of the auditory canal microphone in the auditory canal and/or of the surround microphone in or on the ear is determined. Provided such malposition was recognized, a further training of the adaptive own voice recognition is started.

Preferably, the further training in this case is started based on the auditory canal signal, particularly only if the own voice of the wearer was recognized on the basis of this signal in one of the variants presented above and/or if the acoustic surroundings of the hearing aid are suitable for the further training.

By way of example, such a malposition occurs when putting on or wearing a pair of spectacles, a hat or a scarf. Here, a malposition should be understood to mean a deviation of the position of the auditory canal microphone and/or the surround microphone from the position in which the own voice recognition was trained.

By way of example, a sound path from the mouth of the wearer to the respective microphone is changed on account of the malposition. As a consequence, there is the risk of the algorithm or the filter or filters of the own voice recognition not correctly representing this sound path and possibly of errors arising in the detection of the own voice or of incorrectly determining the noise value. Advantageously, there is a new adaptation of the algorithm or of the filter or filters to the new position and/or orientation of the respective microphone by the further training following the recognition of a malposition. Consequently, the risk of an incorrect detection of the own voice or an incorrect determination of the noise value is at least reduced.

In a suitable configuration of the method, a motion sensor is used for determining the malposition of the surround microphone. Said motion sensor is preferably arranged in or on a housing that holds the surround microphone. Suitably, its alignment, in particular the position and/or the orientation of its axes, can be determined on the basis of the motion sensor. If the motion sensor is rigidly fixed to the housing rigidly holding the surround microphone, a corresponding change in the position and the orientation of the surround microphone is facilitated in advantageously simple fashion on the basis of the change in the position and/or the orientation of the housing.

By way of example, a malposition of the auditory canal microphone is determined by analyzing the auditory canal signal. In particular, to this end, a spectral analysis of this signal is carried out, the signal is examined for changes in the features characteristic for the own voice and/or the transfer function is examined for changes.

According to the invention, a hearing aid comprises an auditory canal microphone and an own voice recognition unit for carrying out an adaptive own voice recognition. In this case, the hearing aid is provided and set up to carry out the method in one of the above-described variants. In particular, the own voice recognition unit is embodied such that training for an adaptive own voice recognition is started based on a signal output by the auditory canal microphone.

Other features which are considered as characteristic for the invention are set forth in the appended claims.

Although the invention is illustrated and described herein as embodied in method for operating a hearing aid, and hearing aid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts and variables corresponding to one another have always been provided with the same reference sign in all figures.

Figure 1:
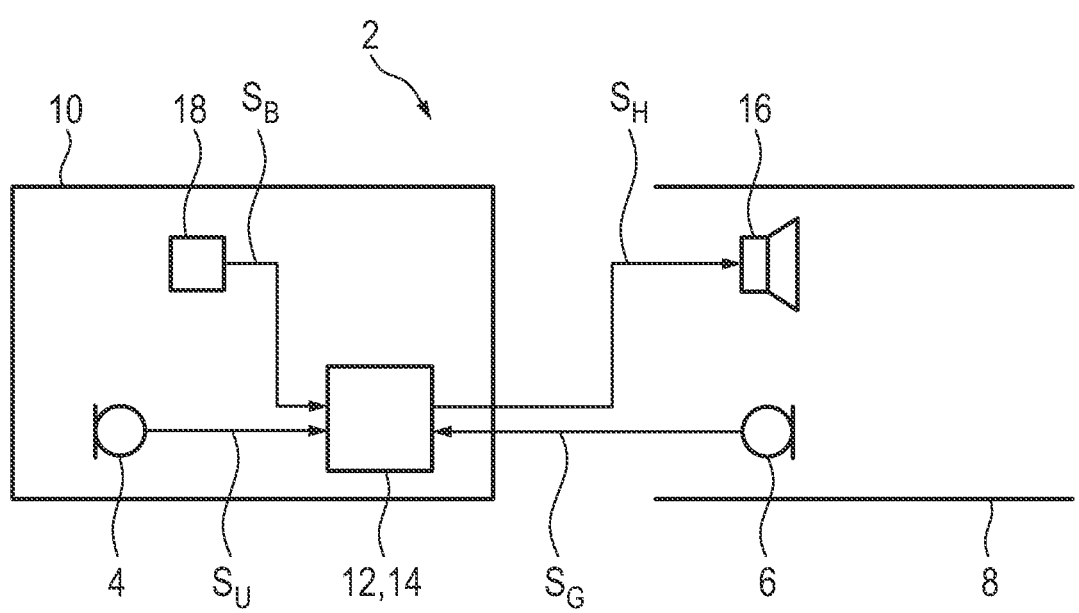
FIG. 1 schematically shows a hearing aid comprising an auditory canal microphone, comprising a surround microphone and comprising an own voice recognition unit.

The hearing aid 2 illustrated in FIG. 1 comprises a surround microphone 4, based on which sound from the surroundings of the wearer of the hearing aid 2 can be captured. Moreover, the hearing aid 2 comprises an auditory canal microphone 6, which serves to capture sound in the auditory canal 8 of the wearer. To this end, the auditory canal microphone 6 is introduced into the auditory canal 8 of the wearer if they are wearing the hearing aid 2 as intended. In this case, the auditory canal 8 is only illustrated schematically in FIG. 1 as lines that are parallel to one another.

According to the embodiment of the hearing aid 2 illustrated in FIG. 1, the latter is embodied as a so-called behind-the-ear hearing aid. In this case, the surround microphone 4 is arranged in a housing 10 which is worn behind the ear, in particular between the auricle of the wearer and their head.

According to an alternative not illustrated in any more detail here, the hearing aid is embodied as an in-the-ear hearing aid, in which both the surround microphone 4 and the auditory canal microphone 6 are arranged in a common housing, which is provided and set up for at least partial insertion into the auditory canal.

The surround microphone 4 and the auditory canal microphone 6 each are an electroacoustic transducer. They convert the respectively captured sound in the surroundings of the wearer, also referred to as surround sound for short, and the captured sound in the auditory canal 8, also referred to as auditory canal sound for short, into an electrical surround signal SU and into an electrical auditory canal signal SG, respectively.

The microphones 4 and 6 are connected to a control unit 12, in which an own voice recognition unit 14 is integrated, for signal transfer. Thus, the own voice recognition unit 14 is a constituent part of the control unit 12.

Furthermore, the hearing aid 2 comprises a receiver 16, in this case a micro-loudspeaker, which is likewise introduced into the auditory canal 8. The receiver 16 is likewise connected to the control unit 12 for signal transfer, and so a receiver signal SH can be output from the control unit 12 to the receiver. The receiver 16 converts the receiver signal SH into sound and outputs the latter into the auditory canal 8 of the wearer.

The hearing aid 2 moreover comprises a motion sensor 18 which is embodied as an acceleration sensor and based on which it is possible to determine the position and/or the orientation of the hearing aid. The motion sensor 18 is received in the housing 10 and rigidly joined therewith at the location, the surround microphone 4 also being arranged in said housing.

Here, the own voice recognition unit 14 is set up to carry out an own voice recognition. Expressed differently, the surround signal SU and/or the auditory canal signal SG are analyzed using the own voice recognition unit 14 in respect of the presence of the own voice of the wearer. In the process, the surround signal SU and/or the auditory canal signal SG are processed by the control unit 12 or by the own voice recognition unit 14, the processing depending on whether the own voice of the wearer was recognized. The receiver signal SH is generated and output to the receiver 16 as a result of the processing.

Here, recognition of the own voice by the own voice recognition is implemented based on an analysis of the signals SU and SG by means of a number of filters F, i.e., one filter on more than one filter. In this case, the filter or filters F have an adaptive embodiment. Consequently, these are changeable or adaptable, especially within the scope of training. In summary, the own voice recognition is adaptive. The filter or at least one of the filters F is embodied in such a way in the process that, if applied, a signal corresponding to the own voice of the carrier or to the part of a signal to be analyzed which corresponds to the own voice is attenuated to the greatest possible extent. Thus, a signal SU or SG analyzed based on this filter F is subject to more attenuation, the more said signal corresponds to the own voice of the wearer.

According to an alternative not illustrated in any more detail here, an algorithm that analyzes the signals SU and/or SG is used in analogous fashion for the recognition of the own voice.

The own voice recognition unit 14 is embodied such that training of the adaptive own voice recognition is started based on the signal SG output by the auditory canal microphone 6, as illustrated in more detail below based on FIG. 2.

Figure 2:
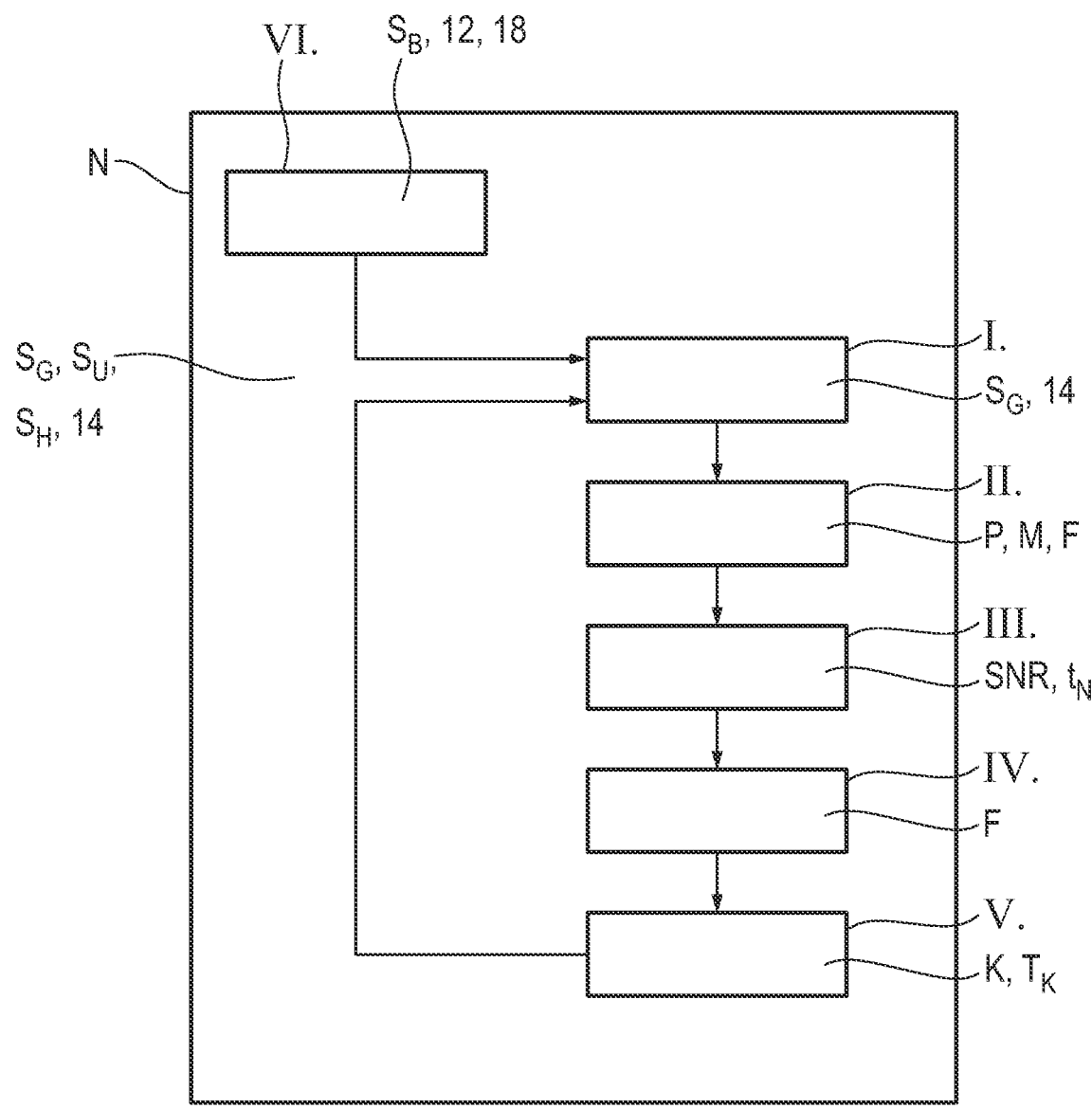
FIG. 2 shows a procedure for operating the hearing aid, in which training of an own voice recognition is started based on a signal output by the auditory canal microphone.

It is evident from FIG. 2 that the training is implemented during normal operation N. In this case, the auditory canal signal SG and/or the surround signal SU is processed, in particular continuously, by the control unit 12 or by the own voice recognition unit 14 and is output to the receiver 16 as receiver signal SH for compensating a hearing deficit of the wearer.

The signal SG output by the auditory canal microphone 6, which corresponds to or represents the sound in the auditory canal 8 of the wearer, is transmitted to the control unit 12, specifically to the own voice recognition unit 14 (step I).

In a second step II, the auditory canal signal SG is analyzed in respect of the presence of the own voice using the own voice recognition unit 14. To this end, the level P of the auditory canal sound is compared to a given threshold based on the auditory canal signal SG or a corresponding value of the auditory canal signal SG. The own voice of the wearer is considered identified should this threshold be exceeded.

Additionally, for the purposes of analyzing the auditory canal signal SG in respect of the presence of the own voice, a spectral analysis in respect of at least one feature M characteristic for the own voice of the wearer is carried out for the auditory canal signal SG.

Furthermore, a filter F1 of the number of filters F of the speech recognition is applied to the auditory canal signal SG and an attenuation of the latter is compared to a specified threshold for the (redundant) analysis as to whether the own voice of the wearer is present. The presence of the own voice is deduced should the attenuation be greater than the threshold.

According to alternatives not illustrated in any more detail, only one or two of the processes presented above, i.e., determining a level of the signal SG, the spectral analysis thereof or the application of a filter to this signal SG, is used for the analysis of the signal SG in respect of the presence of the own voice.

Preferably, the remainder of the method is only carried out if the own voice of the carrier was recognized in step II.

In a third step III of the method, which follows the second step in time, the auditory canal signal SG is used to determine whether the acoustic surroundings of the hearing aid 2 are suitable for training. To this end, the acoustic surroundings are analyzed in respect of a noise and in respect of a reverberation time tN.

To this end, a signal-to-noise ratio SNR is determined for the auditory canal signal SG and is compared to a specified threshold. In this case, the noise is determined by means of a noise estimator.

According to an alternative not illustrated in any more detail, a signal-to-noise ratio SNR is also determined by means of the noise estimator for the surround signal SU.

If the own voice is recognized as per step II, if the specified threshold is exceeded by the signal-to-noise ratio SNR of the auditory canal signal SG, optionally if the threshold is exceeded by the signal-to-noise ratio SNR for the surround signal SU, and in the case of a reverberation time tN that is shorter than a further given threshold, the training of the adaptive own voice recognition is started or, should training have already been started, the latter is continued. Within the scope of the training (step IV), the filter or filters of the own voice recognition are altered.

A convergence value K, which is a measure for the recognition of the own voice by means of the own voice recognition, is determined in a fifth step V. Here, the absolute value of the attenuation (damping) of the surround signal SU and/or of the auditory canal signal SG when applying the filter or filters F of the own voice recognition is used as convergence value K. Further training is admitted if the convergence value K is smaller than a further specified threshold TK; this is illustrated in FIG. 2 based on the arrow from step V to step I. Should the convergence value K be greater than the threshold TK, the training is finished and there is no further training, i.e., the further training is omitted.

In a sixth step VI, a position of the surround microphone 4 is determined based on the signal SB of the motion sensor 18. In this case, signals SB are output from the motion sensor 18 to the control unit 12. They are evaluated by the control unit 12 in respect of their relative position and in respect of their orientation and consequently in respect of the relative position and orientation of the surround microphone 4 and the housing 10. Should a malposition be identified, i.e. a deviation of the position and/or the orientation of the surround microphone from the position in which the own voice recognition was trained earlier in time, the above-described method is carried out again from step I, with, therefore, there being a further training of the own voice recognition. This also occurs should a previously determined convergence value K be greater than the threshold TK. This at least reduces the risk of an incorrect detection of the own voice or incorrect determination on account of the malposition.

Determining whether a malposition is present as per step VI is implemented automatically during the normal operation N in this case. This occurs recurrently here after a specified time interval, for example every 30 seconds.

In summary, the training of the adaptive own voice recognition is controlled based on the signal SG output by the auditory canal microphone 6. Determining whether the training is started or continued is implemented automatically in this case, i.e., without an input by the user.

The invention is not restricted to the above-described exemplary embodiment. Rather, other variants of the invention can also be derived from this by a person skilled in the art without departing from the subject matter of the invention. In particular, all individual features described in the context of the exemplary embodiment are further also combinable with one another in a different way without departing from the subject matter of the invention.

The following is a summary list of reference numerals and the corresponding structure used in the above description of the invention:

LIST OF REFERENCE SIGNS

2 Hearing aid
4 Surround microphone
6 Auditory canal microphone
8 Auditory canal
10 Housing
12 Control unit
14 Own voice recognition unit
16 Receiver
18 Motion sensor
I Output of the auditory canal signal to the own voice recognition unit
II Analysis in respect of the own voice
III Evaluation of the surroundings of the hearing aid
IV Training
V Determination of the convergence value
VI Determination of a malposition of the surround microphone
F,F1 Filter
K Convergence value
M Feature of the own voice
N Normal operation of the hearing aid
P Level
SNR Signal-to-noise ratio
SB Signal of the motion sensor
SG Auditory canal signal
SH Receiver signal
SU Surround signal
tN Reverberation time

The invention claimed is:

1. A method for operating a hearing aid, the method comprising:
providing an auditory canal microphone configured for capturing sound in the auditory canal of a wearer;
providing an own voice recognition unit configured for carrying out an adaptive own voice recognition;
capturing sound in the auditory canal by the auditory canal microphone;
outputting, by the auditory canal microphone, an auditory canal signal that corresponds to the sound in the auditory canal; and
controlling, by starting a training of the adaptive own voice recognition only based on the signal output by the auditory canal microphone, wherein the training is started automatically during a normal operation, and determining a convergence value which represents a measure or quality for recognizing the own voice by the own voice recognition, and admitting or omitting a further training depending on the convergence value and deducing the presence of the own voice based on the convergence value; and
processing, during the normal operation, the auditory canal signal and/or the surround signal by a control unit and outputting the processed signal to a receiver for compensating a hearing deficit of the wearer, wherein speech sequences and/or noise sequences defined in advance for the purposes of training the own voice recognition are not used during normal operation.

2. The method according to claim 1, the method further comprises:
analyzing the auditory canal signal in respect to the presence of the own voice;
starting or continuing the training if the own voice is recognized;
not starting the training, or finishing or interrupting an already started training, if the own voice is not recognized.

3. The method according to claim 2, wherein the step of analyzing the auditory canal signal in respect to the presence of the own voice comprises:
determining a level of the auditory canal signal;
examining the auditory canal signal based on a spectral analysis for features that are characteristic of the own voice of the wearer, and/or
applying a voice recognition filter to the auditory canal signal.

4. The method according to claim 1, the method further comprises using the auditory canal signal for determining whether surroundings are suitable for training.

5. The method according to claim 4, wherein the suitability of the surroundings is based on a noise and/or in respect to a reverberation time in the signal of the auditory canal microphone.

6. The method according to claim 4, the method further comprises determining a noise value based on the signal of the auditory canal microphone.

7. The method according to claim 1, the method further comprises:
detecting a malposition of the auditory canal microphone and/or a surround microphone; and
starting a further training of the adaptive own voice recognition if a malposition was detected.

8. The method according to claim 7, the method further comprises providing a motion sensor configured to determine malposition of the surround microphone.

9. A hearing aid comprising:
an auditory canal microphone;
an own voice recognition unit configured to carry out an adaptive own voice recognition; and
a control unit configured to process the auditory canal signal and/or the surround signal during normal operation;
a receiver configured to output the processed signal for compensating a hearing deficit of the wearer; and
said own voice recognition unit being configured to start a training of said adaptive own voice recognition based on a signal output by said auditory canal microphone, wherein the training is configured to start automatically during a normal operation of the hearing aid, and speech sequences and/or noise sequences defined in advance for the purposes of training the own voice recognition are not used during normal operation, and said own voice recognition unit being configured to determine a convergence value which represents a measure or quality for recognizing the own voice by the own voice recognition, and to admit or omit a further training depending on the convergence value and to deduce the presence of the own voice based on the convergence value.

* * * * *